United States Patent [19]
Howell

[11] 3,973,171
[45] Aug. 3, 1976

[54] GROUND FAULT CIRCUIT INTERRUPTING DEVICE WITH GROUNDED NEUTRAL DETECTION

[75] Inventor: Edward Keith Howell, Simsbury, Conn.

[73] Assignee: General Electric Company, New York, N.Y.

[22] Filed: May 19, 1975

[21] Appl. No.: 578,656

[52] U.S. Cl. .............................. 317/18 D; 317/27 R
[51] Int. Cl.² .......................................... H02H 3/28
[58] Field of Search ............. 317/18 D, 27 R, 33 SC

[56] References Cited
UNITED STATES PATENTS

| | | | |
|---|---|---|---|
| 3,772,569 | 11/1973 | Wible | 317/18 D |
| 3,836,821 | 9/1974 | Wahlgren et al. | 317/18 D |

Primary Examiner—Harry Moose
Attorney, Agent, or Firm—Robert A. Cahill; Walter C. Bernkopf; Frank L. Neuhauser

[57] ABSTRACT

The secondary winding of the differential current transformer in a ground fault circuit interrupter is normally short circuited through an electronic switch. A relaxation oscillator, including a timing capacitor, acts to periodically open the switch and divert any secondary current through a burden resistor, developing thereacross a relatively high amplitude fault signal voltage indicative of a liine ground fault. The timing capacitor discharges through the primary winding of a second transformer coupled with the neutral conductor to develop, in the event of a desensitizing neutral ground fault, a fault signal voltage across the burden resistor.

8 Claims, 3 Drawing Figures

GROUND FAULT CIRCUIT INTERRUPTING DEVICE WITH GROUNDED NEUTRAL DETECTION

BACKGROUND OF THE INVENTION

Ground fault circuit interruption (GFCI) devices have been sanctioned by the National Electric Code for use in residential circuits to protect against the hazards of electrical shock. Such GFCI devices, as presently commercially available, utilize a differential current transformer to sense a current imbalance in the line and neutral conductors occasioned by ground leakage current from the line conductor returning to the source through an unintended ground circuit path other than the neutral conductor. To prevent injurious electrical shock, the differential current transformer must develop a signal voltage of sufficient magnitude to enable a signal processor to initiate circuit interruption in the event of a current differential in the line and neutral conductors as low as 5 milliamps. For ease of manufacture and to provide a compact design, the line and neutral conductors, which constitute the primary windings of the differential current transformer, typically each make a single pass through the aperture of the toroidal transformer core. Thus to satisfy a 5 milliamp trip level, the signal processor must respond to a transformer primary excitation of less than 0.005 ampere-turns. To ease design constraints on the signal processor, the differential transformer should have a high permeability core and a secondary winding of many turns — typically in excess of a thousand turns of very fine wire — in order to develop signal voltages of manageable amplitudes. Signal levels are, nevertheless, quite low, 1 to 10 millivolts, requiring high amplification. With such high amplification, the processor design must insure amplifier stability and adequate noise immunity to prevent nuisance tripping.

An additional requirement of GFCI devices of this type necessary for Underwriters Laboratories listing is the capability of detecting a low impedance ground fault on the neutral conductor adjacent the load. Since the neutral conductor is also grounded at the source, such double grounding of the neutral conductor could create a situation where a portion of the ground fault current from the line conductor returns to the source through the neutral conductor. As a consequence, the current differential showing up in the differential transformer would not be truly indicative of the magnitude of the ground leakage current. It is thus seen that a low impedance neutral to ground fault has the potential of desensitizing the differential current sensor such that the GFCI would trip only in response to considerably higher ground leakage current levels. Under these circumstances, the GFCI device cannot afford protection to the degree intended.

Applicant's co-pending application, Ser. No. 571,930, filed Apr. 28, 1975, which is a continuation-in-part of application Ser. No. 509,462, filed Sept. 26, 1974, discloses an approach to GFCI sensor design which dramatically increases the fault signal amplitude while permitting utilization of a differential current transformer of less expensive construction. The disclosure of this co-pending application is specifically incorporated herein by reference. Pursuant to the approach disclosed therein, the differential transformer secondary is normally operated in a short circuited mode through an electronic switch. Current developed in the secondary winding in response to a current differential in the line and neutral conductors flows through the switch in shunt with a relatively high burden resistance. Periodically, the switch is momentarily opened to divert this secondary current through the burden resistance, developing thereacross a signal voltage of higher magnitude than can otherwise be achieved. A working embodiment of the invention disclosed in this co-pending application was found capable of developing signal voltage spikes of 200 millivolts peak amplitude in response to a 0.005 ampere differential in one-turn primary windings. With the prior art approach of continuously flowing secondary current through a burden resistor, signal voltages of 1 to 10 millivolts are typical. The differential current transformer embodied a ferrite core with a 125-turn secondary winding, as contrasted to an expensive, high permeability, nickel-iron core with on the order of 1500 secondary turns.

It is accordingly an object of the present invention to provide an improved ground fault circuit interrupting device of the type disclosed in the above-noted co-pending application having the capability of detecting desensitizing ground faults on the neutral conductor.

A further object is to provide a ground fault circuit interrupting device of the above character which is simple in design and inexpensive to manufacture.

Other objects of the invention will in part be obvious and in part appear hereinafter.

SUMMARY OF THE INVENTION

In accordance with the present invention, there is provided an improved ground fault circuit interrupting device having the capability of detecting ground faults on the line and neutral conductors of a power distribution circuit and for interrupting the circuit should these ground faults be of a hazardous character. More specifically, the present invention utilizes a differential current sensor of the type disclosed and claimed in my above-noted co-pending application. This current sensor is in the form of a differential current transformer comprising a toroidal core having a pair of preferably single-turn primary windings which are respectively connected in the line and neutral sides of the distribution circuit for which ground fault protection is sought. The transformer can and preferably does utilize an inexpensive, low permeability ferrite core, rather than an expensive, high permeability nickel-iron core as currently employed in GFCI differential current transformers. The secondary of the current sensor is a multi-turn secondary winding, however, the number of turns can be and preferably is considerably fewer — as much as an order of magnitude fewer turns — than existing GFCI differential current transformers.

The secondary winding is periodically, preferably at the zero crossing of line voltage, shorted on itself through an electronic switch connected in parallel with a relatively high resistance burden resistor. Any secondary current flow occasioned by the existence of a current differential in the primary windings normally flows through the electronic switch, rather than always through a burden resistor, as is the conventional practice. Periodically, preferably approximate the peak of each alternate half cycle of the line voltage, the electronic switch is opened to divert the secondary current through the burden resistor, thereby developing, by virtue of the higher burden resistance, a momentary, relatively large signal voltage thereacross for application to signal processing circuitry pursuant to initiating a trip function. To control the switch operation in accordance with the present invention, a relaxation oscillator synchronized to the line frequency momentarily opens the electronic switch. The oscillator includes a timing capacitor which charges up to a predetermined threshold voltage and then discharges to open the electronic switch. In accordance with a specific feature of the invention, the timing capacitor discharge current is directed through a primary winding of a second transformer having at least one secondary winding connected in series with the neutral side of the distribution circuit. If the neutral conductor, in addition to being grounded at the source, is also connected to ground through a ground fault adjacent the load, it is seen that the secondary of this second or neutral transformer becomes a closed loop. Thus, excitation of its primary winding by the timing capacitor produces a current flow in the neutral conductor, and, if the fault impedance is sufficiently low, this secondary current will create a sufficient current differential in the line and neutral conductors to precipitate circuit interruption.

The invention accordingly comprises the features of construction, combination of elements, and arrangement of parts which will be exemplified in the construction hereinafter set forth and the scope of the invention will be indicated in the claims. For a fuller understanding of the nature and objects of the invention, reference should be had to the following detailed description taken in conjunction with the accompanying drawings, in which:

FIG. 1 is a schematic diagram of a ground fault circuit interruption (GFCI) device embodying the present invention; and FIGS. 2 and 3 are a series of voltage waveforms useful in understanding the operation of the GFCI device of FIG. 1.

DETAILED DESCRIPTION

Figure 1:
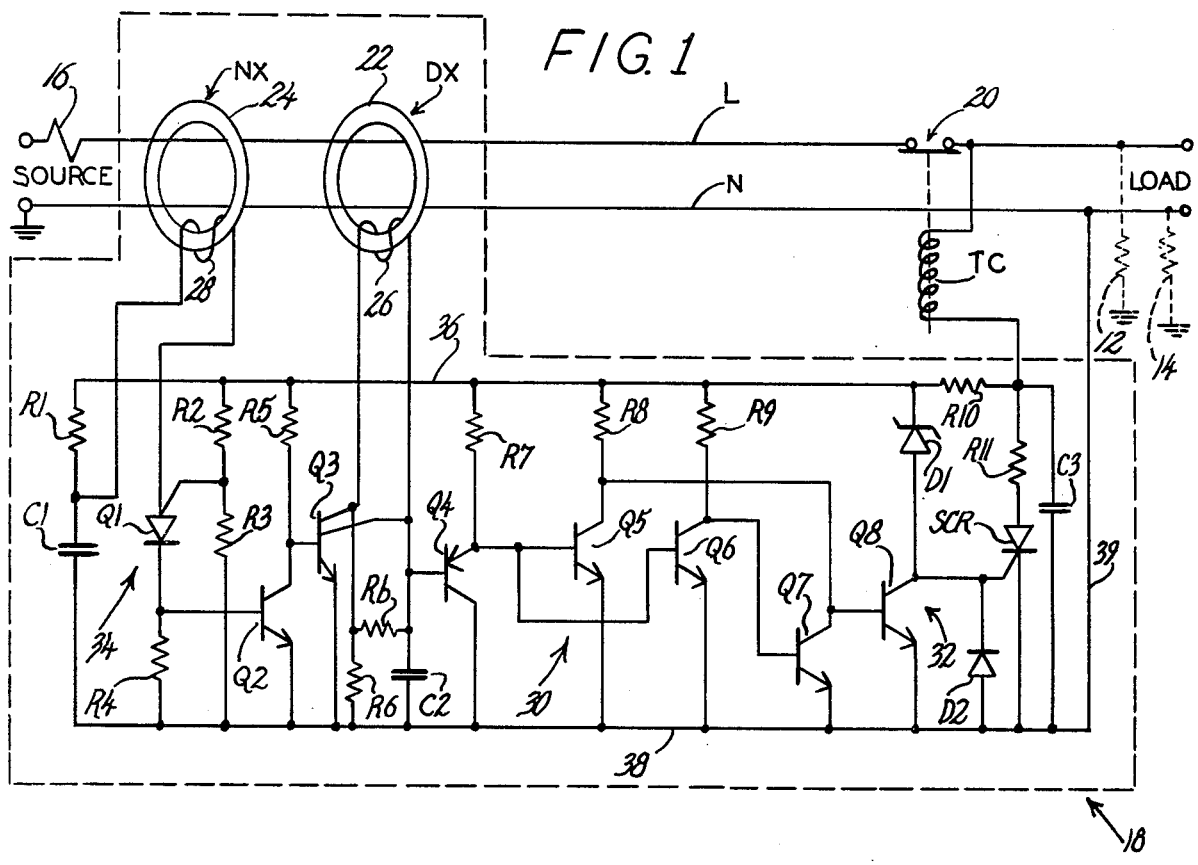

Referring now to the drawing, the ground fault circuit interrupting (GFCI) device of FIG. 1 is shown implemented to interrupt a power distribution circuit consisting of a line conductor L and a neutral conductor N in the event of a high impedance ground fault, indicated at 12, on the line conductor or a low impedance ground fault, indicated at 14, on the neutral conductor. The neutral conductor is illustrated as being grounded at the source, as is conventional practice in residential circuits. The GFCI device may include overload and short circuit trip initiating elements, indicated diagrammatically at 16, as is also conventional. To detect the line and neutral ground faults 12 and 14, the GFCI device includes a module, generally indicated at 18, for sensing a current imbalance in the line and neutral conductors occasioned by either one of these ground faults. When this current imbalance reaches a predetermined threshold level, the module 18 functions to enable energization of a trip coil TC connected to the line conductor and consequent opening of the line conductor by contacts 20.

Module 18 includes a differential current transformer DX and a neutral transformer NX having toroidal cores 22 and 24, respectively. The line and neutral sides of the distribution circuit pass through the apertures in these toroidal cores to serve as respective one-turn transformer windings. Differential current transformer DX is equipped with a multi-turn secondary winding 26, while neutral transformer 24 is equipped with a multi-turn primary winding 28. The differential current transformer functions as a sensor by developing in its secondary circuit a current proportional to the differential in the currents flowing in the line and neutral conductors. As will be described in greater detail, this secondary current develops a fault signal voltage across a burden resistor Rb which is applied to a threshold detection network, generally indicated at 30. The threshold detection network controls a clamp and driver network, generally indicated at 32, connected to the gate of a thyristor SCR included in series with trip coil TC across the line and neutral conductors. The primary winding 28 of neutral transformer NX is driven by a relaxation oscillator, generally indicated at 34, which also functions to control the condition of an electronic switch, in the form of a dual collector transistor Q3 operating to normally shunt differential transformer secondary current around burden resistor Rb.

Turning to a detailed description of the schematic diagram of FIG. 1, the lower terminal of trip coil TC is connected to a positive voltage bus 36 through resistor R10 and to the anode of thyristor SCR through a resistor R11. The cathode of thyristor SCR is connected to a bus 38, which is referenced to ground by virtue of its connection via lead 39 to neutral conductor N. A filtering capacitor C3 is connected from junction of resistors R10 and R11 to bus 38. Power supply current and voltage are derived from the line conductor through the trip coil and resistor R10 to bus 36. This supply current powering the active portion of the module 18 is of a level well below the actuation level of the trip coil and thus the contacts 20 remain closed. As will be seen, actuation of the trip coil is achieved when thyristor SCR is triggered to its conductive state by the clamp and driver circuit 32 to thus complete a low impedance energizing circuit drawing sufficient current through the trip solenoid to achieve its actuation and consequent opening of contacts 20.

Figure 2:
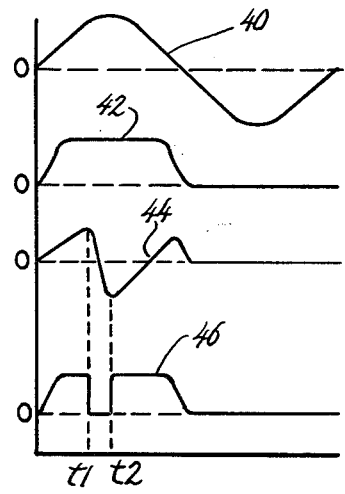

As the line voltage, illustrated by waveform 40 of FIG. 2, starts into each positive half cycle, supply current flows through resistors R10 and R8 to provide base drive for transistor Q8. This transistor becomes conductive, connecting the anode of zener diode D1 to bus 38 and also shorting the gate and cathode of thyristor SCR together. This insures that thyristor SCR is maintained in its non-conductive condition during the initial portion of each positive half cycle of the module supply voltage. Zener diode D1, with its cathode connected to bus 36, serves as a shunt voltage regulator, clamping the voltage on bus 36 to a positive voltage level, for example 10 volts. The regulated voltage on bus 36 is illustrated by waveform 42 in FIG. 2. The current conducted by zener diode D1 while clamping bus 36 normally flows through the collector-emitter circuit of transistor Q8. However, when transistor Q8 is rendered non-conductive, this current provides gate drive for triggering the thyristor SCR into conduction to precipitate a trip function. During negative half cycles of the line voltage, current flows through resistor R10 and diodes D1 and D2 in their forward directions.

Under normal conditions, the voltage established at the emitter of transistor Q4, in conjunction with appropriate selection of the resistors R7, R8 and R9 and transistors Q4, Q5 and Q6, dictates that transistor Q5 is in a low conductance state and transistor Q6 in a high conductance state. As a consequence, there is sufficient voltage at the collector of transistor Q5 to provide base drive current for sustaining the conductance of transistor Q8, while the voltage at the collector of transistor Q6 is too low to drive transistor Q7 into conduction. To achieve this, the current density in transistor Q6 is limited to a value less than that of transistor Q4, and the current density in transistor Q5 is designed for a value higher than that of transistor Q4. For example, to establish a tripping response threshold to a positive or negative charge of 30 millivolts in the voltage at the emitter of transistor Q4, with transistors Q4, Q5 and Q6 having equal emitter areas, resistor R8 should be approximately one-third and resistor R9 approximately three times the resistance value of resistor R7. While transistor Q6 is conducting, transistor Q7 is cut off. To turn transistor Q8 off and thus enable triggering of rectifier SCR, it is seen that either transistor Q5 or transistor Q7 must be driven into saturation to divert base current from transistor Q8.

Transistor Q3, constituting the electronic switch shorting secondary winding 26 of differential transformer DX, is illustrated as being a dual collector transistor switch which advantageously exhibits a low impedance and a low offset voltage between the two collectors during its ON condition. However, since the voltage between its emitter and collectors is not zero, the differential transformer winding 26 must be returned to ground through a resistor R6 having a resistance in the order of 100 ohms. Burden resistor RB may be on the order of 1,000 ohms for a differential current transformer having a turns-ratio of 1 to 125. Capacitor C2, connected between one side of secondary winding 26 and bus 38, filters out high frequency noise appearing in the differential transformer secondary circuit. It will be appreciated that the transistor switch Q3 may take other forms, such as two carefully matched transistors connected in parallel.

Normally, the base drive current is drawn from bus 36 through resistor R5 to turn transistor Q3 on, rendering the impedance between its two collectors essentially zero. As a consequence, the two sides of the differential transformer secondary winding 26 are shorted together through the two collectors of transistor Q3, shunting out burden resistor Rb. Control of the condition of electronic switch Q3 is performed by oscillator 34 having, as its active element, a programmable unijunction transistor Q1. The anode of this transistor is connected to one side of the neutral transformer secondary winding 28 and its cathode is connected to the bus 38 through a resistor R4. The other side of winding 28 is connected to the junction between a resistor R1 and a timing capacitor C1. The upper terminal of resistor R1 is connected to bus 36, while the lower terminal of capacitor C1 is connected to bus 38. Gate voltage for transistor Q1 is derived from a voltage divider consisting of resistors R2 and R3 connected across buses 36 and 38. The cathode of transistor Q1 is connected directly to the base of a transistor Q2.

As the voltage on bus 36 begins rising toward its regulated level during each positive half cycle of the line voltage, unijunction transistor Q1 is non-conductive. Base drive current through resistor R5 is thus available to turn transistor switch Q3 on, short circuiting the differential transformer secondary winding 26. Meanwhile, timing capacitor C1 is being charged through resistor R1 toward the regulated voltage to which bus 36 is clamped by zener diode D1 (waveform 44, FIG. 2). When the voltage at the junction of capacitor C1 and resistor R1, as applied through neutral transformer primary winding 28 to the anode of unijunction transistor Q1, rises to a level exceeding the gate voltage, the unijunction transistor fires (time $t1$ in FIG. 2). Capacitor C1 thus abruptly discharges through primary winding 28 and the unijunction transistor, driving transistor Q2 into conduction. Base drive current is shunted from transistor Q3, causing this transistor to cut off and remove the short across the secondary winding 26. The voltage at the base of transistor Q3 is illustrated by waveform 46 of FIG. 2.

Figure 3:
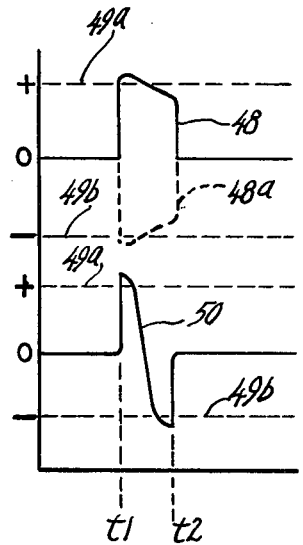

As was fully disclosed in the above-noted co-pending application, the abrupt removal of the shunt across the burden resistor Rb diverts any secondary current through burden resistor Rb to develop a signal voltage of significantly greater amplitude than is otherwise obtainable. This signal voltage, applied to the base of transistor Q4, may be either of a positive or negative polarity, as illustrated in waveforms 48, 48a of FIG. 3, depending upon whether the ground fault current is in phase or out of phase with the line voltage. Transistor Q4 functions essentially as an emitter-follower, and thus this signal voltage, depending on its polarity, either increases or depresses the normal voltage at the emitter thereof. If the signal voltage increases the emitter voltage of transistor Q4 above a positive threshold level (indicated at 49a in FIG. 3), transistor Q5 is driven into saturation, depriving base drive current for transistor Q8. This latter transistor goes into cutoff, unclamping the gate of thyristor SCR. The current flowing through zener diode D1 is thus diverted to the gate of thyristor SCR, triggering it into conduction and opening of contacts 20 ensues. If the signal voltage at the base of transistor Q4 depresses its emitter voltage below threshold level 49b in FIG. 3, transistor Q6 is turned off, causing transistor Q7 to turn on and likewise divert base drive current from transistor Q8. Transistor Q8 is thus cut off and zener current is diverted to trigger thyristor SCR, initiating a trip function.

After timing capacitor C1 is discharged, unijunction transistor Q1 returns to its non-conductive state, and transistor Q2 turns off. Transistor switch Q3 thus turns on at time $t2$ in FIG. 2 to reimpose the short across the secondary winding 26. By way of example, unijunction transistor Q1 may be programmed to maintain transistor switch Q3 closed for the first 3.2 milliseconds of each positive half cycle of the line voltage. At time $t1$, indicated in FIG. 2, the voltage on capacitor C1 has reached the level where transistor Q1 fires and transistor switch Q3 is opened for a very short interval $t1$ to $t2$ of, for example, 60 microseconds.

As previously noted, timing capacitor C1 discharges through primary winding 28 of neutral transformer NX. Because of the inductance of neutral transformer primary winding 28, the discharge current of capacitor C1 is one-half cycle of a sine wave of a frequency determined by its capacitance and the inductance of the neutral transformer. This frequency may be on the order of 10 kiloHertz. The voltage appearing across the primary winding of the neutral transformer therefore has a cosine waveform of one-half cycle and this same voltage waveform is induced on the neutral conductor N. If the neutral conductor, while grounded at the source end, is also connected to ground through a ground fault 14 of sufficiently low resistance, for example 6 ohms or less, the resulting current flow produced in the neutral conductor will unbalance the differential current transformer DX. The resulting signal voltage developed across burden resistor Rn while transistor switch Q3 is open is illustrated by waveform 60 in FIG. 3 as having positive and negative-going spikes. In the absence of line-to-ground fault current, either polarity of this neutral fault signal voltage is of sufficient amplitude to render transistor Q8 non-conductive, with consequent triggering of thyristor SCR. If, at the same time, the line conductor L is also experiencing a ground fault, the current imbalance occasioned thereby will produce a signal voltage at the base of transistor Q4 effective to add to the neutral fault signal voltage in either the positive or negative direction. Thus, in the presence of ground faults on both line and neutral conductors, it is seen that interruption will be achieved at lower values of ground leakage current and higher values of neutral ground fault resistance.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A module for utilization in a ground fault circuit interrupting device wired into a power distribution circuit comprising at least one line conductor and a neutral conductor, said module comprising, in combination:
   A. a differential current transformer including
      1. a core in which is developed a magnetic flux occasioned by a current imbalance in the line and neutral conductors of the distribution circuit, and a secondary winding wound on said core;
   B. an output element connected across said secondary winding for developing a signal voltage indicative of the magnitude of secondary current developed as a result of the current imbalance;
   C. a normally conductive electronic switch connected across said secondary winding in shunt with said output element; and
   D. a neutral transformer having a secondary winding for connection in series with the neutral conductor and a primary winding; and
   E. a pulse generator connected to supply a periodic pulse output through said primary winding of said neutral transformer to render said switch non-conductive for the interval of said pulse and thereby divert said secondary current through said output element pursuant to developing said signal voltage.

2. The module defined in claim 1, wherein said output element constitutes a high burden resistance.

3. The module defined in claim 1, wherein said pulse generator is in the form of a relaxation oscillator having a timing capacitor connected to periodically discharge through said primary winding of said neutral transformer to render said switch non-conductive.

4. A ground fault circuit interrupting device for interrupting an electrical power distribution circuit including at least one line conductor and a neutral conductor in the event of a ground fault on either conductor of predetermined impedance characteristics, said device comprising, in combination:
   A. circuit interrupting contacts for connection in series with the line conductors;
   B. a trip solenoid operating, when energized, to initiate separation of said contacts and interruption of current flow in the distribution circuit;
   C. a differential current transformer including
      1. a first primary winding for connection in series with the line conductor,
      2. a second primary winding for connection in series with the neutral conductor, and
      3. a secondary winding in which is developed a secondary current proportional to the imbalance in the currents flowing in said first and second primary windings;
   D. an output element connected across said differential transformer secondary winding;
   E. a normally conductive electronic switch connected across said differential transformer secondary winding in shunt with said output element;
   F. a neutral transformer having a secondary winding for connection in series with the neutral conductor and a primary winding;
   G. a pulse generator connected to supply a periodic pulse output through said primary winding of said neutral transformer to render said switch non-conductive for the interval of said pulse and thereby divert said secondary current through said output element pursuant to developing a trip signal voltage thereacross; and
   H. a signal processor processing said trip signal voltage and initiating energization of said trip solenoid in the event the amplitude of the signal voltage exceeds a predetermined minimum.

5. The device defined in claim 4, wherein said output element constitutes a high burden resistance.

6. The device defined in claim 5, wherein said pulse generator is in the form of a relaxation oscillator having a timing capacitor connected to periodically discharge through said primary winding of said neutral transformer to render said switch non-conductive.

7. The device defined in claim 6, wherein said timing capacitor charges and discharges in synchronism with the line frequency of the power distribution circuit.

8. The device defined in claim 7, wherein said relaxation oscillator includes an active element programmed to discharge said capacitor through said primary winding of said neutral transformer at a time approximate the peak of alternate half-cycles of the line voltage of the power distribution circuit.

* * * * *